United States Patent [19]

Phillips

[11] Patent Number: 5,269,215
[45] Date of Patent: Dec. 14, 1993

[54] CONTROL VALVES HAVING PARASITIC LEAKAGE ORIFICES

[75] Inventor: Edward H. Phillips, Troy, Mich.

[73] Assignee: Techco Corporation, Birmingham, Mich.

[21] Appl. No.: 841,322

[22] Filed: Feb. 25, 1992

[51] Int. Cl.$^5$ .............................................. F15B 9/10
[52] U.S. Cl. .................................. 91/375 R; 60/468; 137/625.23; 137/625.24
[58] Field of Search ................ 60/392, 393, 468, 494; 91/375 R, 375 A, 437; 137/625.23, 625.24; 74/388 PS; 180/132, 143, 141, 142

[56] References Cited

U.S. PATENT DOCUMENTS

| | | | |
|---|---|---|---|
| 4,561,516 | 12/1985 | Bishop et al. | 91/375 R |
| 4,678,052 | 7/1987 | Suzuki et al. | 180/143 |
| 4,848,402 | 7/1989 | Elser et al. | 137/625.23 |
| 4,924,910 | 5/1990 | Tabata et al. | |
| 5,086,687 | 2/1992 | Elser et al. | 91/375 A |

Primary Examiner—Edward K. Look
Assistant Examiner—F. Daniel Lopez
Attorney, Agent, or Firm—Gifford, Groh, Sprinkle, Patmore and Anderson

[57] ABSTRACT

The present invention is directed to a vehicular power steering system having an "open-center" control valve that has substantially zero hydraulic flow gain at zero input deflection angle and yet has minimal control orifice area. Improved valving arrangement is desirable in that it leads to rapid restoration of hydraulic flow gain at relatively small input deflection angles. The improved valving arrangement includes small transverse leakage slots formed in a valve spool that are positioned in parallel with either input or return flow distribution slots. The leakage slots are configured to form parasitic flow orifices which fluidically interconnect the output slots formed in the valve sleeve and which communicate with the fluid chambers formed on opposite sides of the piston in the power cylinder. Accordingly, a selectively variable leakage path is provided across the power cylinder.

13 Claims, 9 Drawing Sheets

CONTROL VALVES HAVING PARASITIC LEAKAGE ORIFICES

BACKGROUND AND SUMMARY OF THE INVENTION

The present invention relates generally to control valves of the type commonly utilized in vehicular power steering systems and, more particular, to such control valves having one or more parasitic leakage orifices provided for optimizing the performance characteristic of the power steering system.

It is known that power steering systems equipped with control valves having minimal control orifice area are capable of generating significant hydraulic "assist" at low, or even zero, input deflection angles. Such capability is demonstrated from the performance characteristics for the low speed section of the power steering valve described in SAE Paper 880707, and entitled 1988 LINCOLN CONTINENTAL VARIABLE-ASSIST POWER STEERING SYSTEM. However, the presence of significant hydraulic assist at zero input deflection angle typically results in unacceptably light "on-center" feel. As further described in the SAE paper, the steering system includes a parallel flow circuit having a conventionally sized orifice area which is progressively activated at higher speeds. Utilization of such a parallel flow circuit results in minimal hydraulic assist at low, or even moderate, input deflection angles. Unfortunately, a side effect of eliminating virtually all hydraulic assist at low input deflection angles is a significant reduction in steering precision. Under such condition, the vehicle will tend to "wander" when subjected to transient conditions, such as those caused by wind loadings.

Modernly, the ability to provide variable hydraulic assist with respect to vehicular speed (i.e., commonly referred to as "speed sensitive" steering) is required in most power steering systems. A conventional method of providing speed sensitive steering is achieved by selectively varying the fluid supply flow rate to an otherwise standard control valve. This is usually accomplished via the incorporation of an EVO (electronically variable orifice) valve into the flow control circuit of the host system's fluid supply pump. As a result, a reduction in the fluid supply flow rate at higher vehicle speeds causes a lowered hydraulic flow gain function for the control valve. Thus, at very low vehicle speeds the amount of fluid flow through the control valve is maximized for reducing sterring effort (i.e., for parking requirements). At higher vehicle speeds, as the rate of fluid flow through the control valve is reduced, any given amount of hydraulic steering assist requires a concomitantly greater input deflection angle. Since this requires rotational movement of the steering wheel against the restoring force of a spring member (i.e., a torsion bar), more input torque is required such that steering forces are increased when the motor vehicle is being driven on the highway. Again however, the unwanted side effects of excessive valve deflection and a reduction in steering precision are present.

In the event that rapid steering wheel motion is required when the power steering system is subjected to the reduced flow rates (i.e., an "accident avoidance maneuver"), there may be insufficient fluid flow to adequately provide for the concomitant displacement of the system's power cylinder. This undesirable condition is commonly referred to as "pump catch" whereby the vehicle operator momentarily encounters a sharp increase in resistance to steering motion. Accordingly, means must also be provided for sensing rapid motions of the steering wheel and instantaneously modifying the EVO valve setting in order to increase flow to avoid the occurrence of "pump catch". Unfortunately, this leads to another unwanted side effect wherein steering effort is suddenly diminished during the "accident avoidance maneuver", which may potentially exacerbate the steering control difficulties already being encountered during the "accident avoidance maneuver".

Accordingly, the present invention is directed to providing a vehicular power steering system having an "open-center" control valve that has substantially zero hydraulic flow gain at zero input deflection angle, and yet has minimal control orifice area. This valving arrangement is desirable in that it leads to a rapid restoration of hydraulic flow gain at relatively small input deflection angles.

In a first preferred embodiment, an improved valving sub-assembly is provided having small transverse leakage slots formed in a valve spool that are positioned in parallel with either input or return flow distribution slots also formed in the valve spool. The leakage slots are configured to form parasitic flow orifices which fluidically interconnect output slots formed in a valve sleeve. In this manner, a selectively variable "leak" is provided across the power cylinder. As a result, the relationship between output pressure and valve deflection at, or near, zero valve deflection values is of a second order such that an output pressure slope having substantially zero value at zero valve deflection is generated. Moreover, even though hydraulic flow gain is substantially zero at zero valve deflection, a smooth recovery to normal values at modest values of valve deflection is generated for providing optimal static control characteristics for the power steering control valve.

As a related feature, since the parasitic flow orifices allow utilization of minimally sized main flow control orifices, the characteristic "output pressure input deflection angle" curves are relatively widely separated as a function of load flow rates. This relationship is indicative of the presence of relatively large amounts of input torque modulation as rotational velocity inputs are made to the steering wheel. Therefore, the host power steering system "feels" highly damped and is very smooth in operation. In addition, a relatively stiff torsion bar can be utilized within the control valve, thus yielding increased steering precision steering wherein extremely small values of positional error (i.e., due to valve deflection) are present.

An alternate design philosophy is incorporated into yet another preferred embodiment of the present invention wherein first and second sets of parasitic slots are arranged such that their corresponding parasitic orifices close sequentially with respect to the input and return flow control orifices. More particularly, both sets of parasitic orifices are open at zero valve deflection. However, the first set of parasitic orifices closes at a smaller valve deflection than the input and return flow control orifices and the second set of parasitic orifices closes at a larger valve deflection than the input and return flow control orifices. This results in a greater range of design freedom for the valve designer in shaping the various output pressure-valve deflection characteristic curves as a function of load flow.

Other features, objects and advantages of the present invention will become readily apparent to one skilled in

DETAILED DESCRIPTION OF THE PREFERRED EMBODIMENTS

With particular reference to the drawings, an improved valving sub-assembly 10 is shown to include a valve spool 12 and a valve sleeve 14 (shown in phantom in its normally "centered" position surrounding valve spool 12). As will be appreciated, the specific physical construction of valving sub-assembly 10 is merely exemplary in nature such that valving sub-assembly 10 can be readily adapted for use in virtually any conventional vehicular power steering system having an open-center control valve. Thus, a control valve formed with an axial configuration (as opposed to the rotary type depicted in FIG. 1) could likewise be simply modified according to the teachings of the present invention. An example of a control valve suitable for incorporation of valving sub-assembly 10 therein is shown and described in U.S. Pat. No. 4,460,016 entitled ROTARY SERVO-VALVE by Haga et al. which issued on Jul. 17, 1984, the disclosure of which is expressly incorporated by reference herein.

Figure 1:
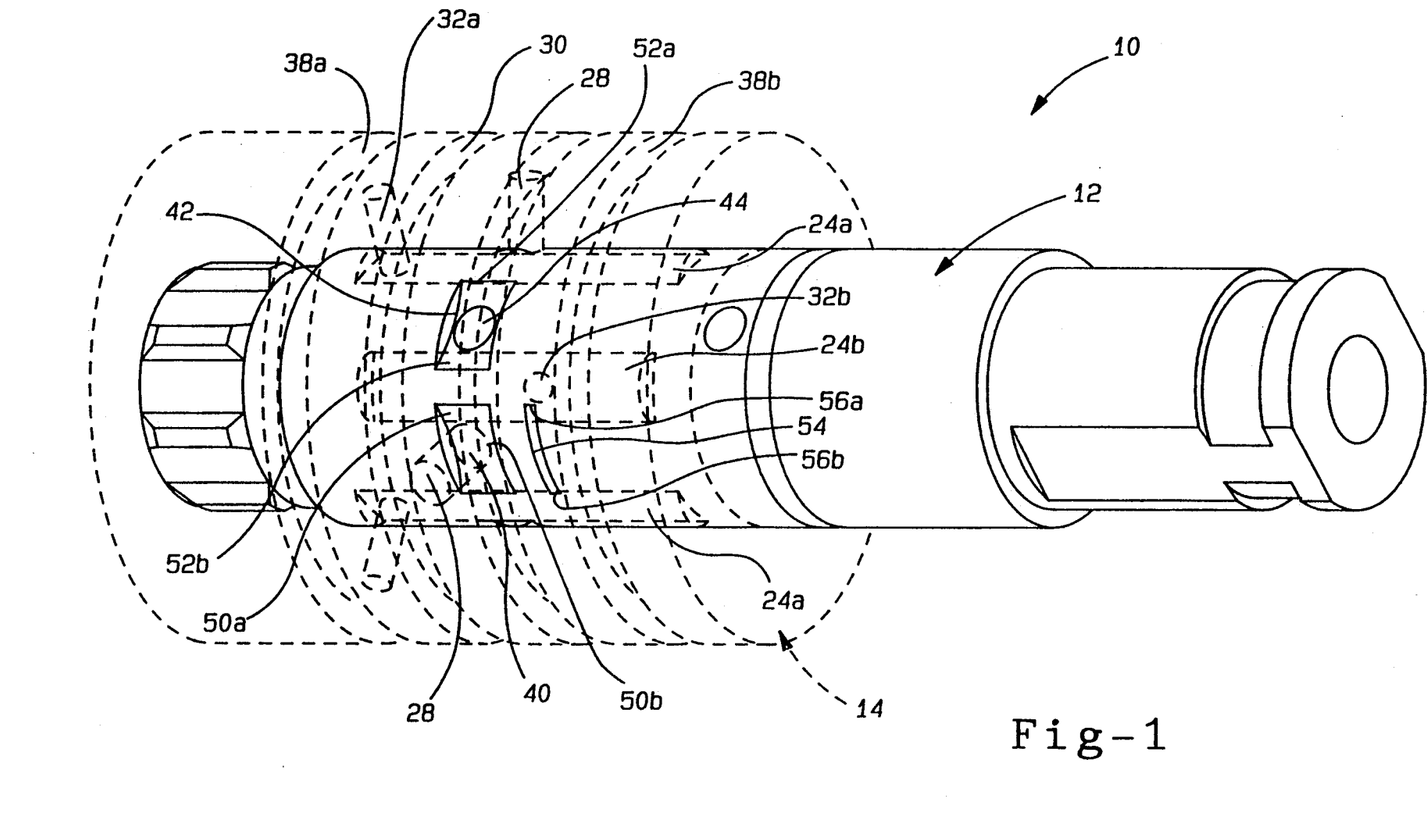
FIG. 1 is a perspective view of an improved valving sub-assembly of an open-center control valve showing the relative positioning and size of the input, return, parasitic and output slots associated therewith according to a first embodiment of the present invention.
Figure 2A:
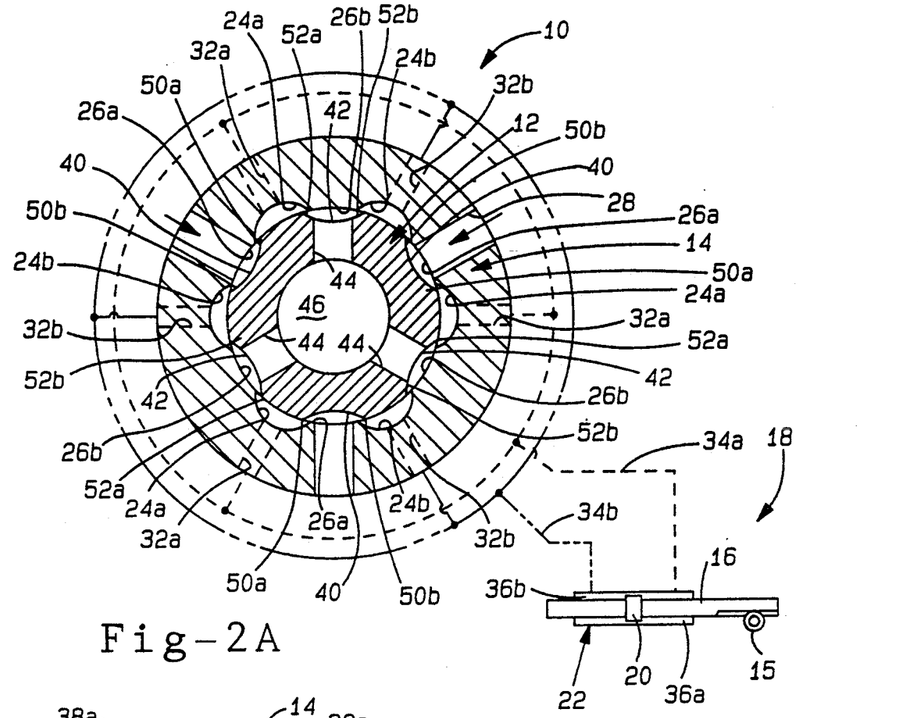
FIG. 2A is a sectional view illustrating the input and return flow control orifice configuration associated with the improved valving sub-assembly shown in FIG. 1.

With particular reference now to FIGS. 1 and 2A, improved valving sub-assembly 10 of the type adapted for use in a four-way "open-center" control valve of a vehicular power steering control apparatus is disclosed. As noted, valving sub-assembly 10 includes valve sleeve 14 and a valve spool 12 received therein, and which are rotatable with respect to each other within the control valve. As is known, the rotational position of valve sleeve 14 is substantially coupled to a pinion shaft 15 which is supported within the host vehicle's power steering control apparatus and which is meshingly coupled with a rack shaft 16 of a power steering piston/rack assembly 18. As is known, the opposite ends of rack shaft 16 are operably connected to the host vehicle's dirigible wheel assemblies via suitable steering linkage mechanisms in a conventional manner. As is schematically shown is FIG. 2A, rack shaft 16 is operably connected to a piston 20 that is movable within a power cylinder 22 of piston/rack assembly 18.

Valve sleeve 14 includes a plurality of axially extending valve slots 24 formed circumferentially about its inner surface thus defining lands 26 between adjacent valve slots 24. For clarity purposes, the alternating slots 24 are hereinafter referred to as first and second valve output slots 24a and 24b, respectively, while the alternating lands are hereinafter referred to as first and second lands 26a and 26b, respectively. Supply or input ports 28 are formed through first lands 26a which fluidly communicate with a housing pump port (not shown) formed in the control valve housing via an annular groove 30 formed in the exterior surface of valve sleeve 14. In addition, first and second output ports 32a and 32b, respectively, are formed in valve sleeve 14 and open at the bottom of first and second valve output slots 24a and 24b, respectively, and communicate with load lines 34a and 34b, respectively. Output ports 32a and 32b are in fluid communication with first and second chambers 36a and 36b, respectively, of power cylinder 22 via load lines 34a and 34b, respectively. More specifically, radial output ports 32a and 32b are fluidically coupled to their respective load lines 34a and 34b via annular output grooves 38a and 38b, respectively, formed in valve sleeve 14 and their respective distribution ports (not shown) which are formed in the control valve housing.

The circumferential exterior surface of valve spool 12 is formed with a plurality of inlet slots 40 which angularly correspond to input ports 28 formed through first lands 26a of valve sleeve 14. In addition, valve spool 12 is also formed to include an identical plurality of return slots 42 which are aligned in a alternating relationship relative to inlet slot 40 and are angularly aligned with second lands 26b. Exhaust ports 44 provide fluid communication between return slots 42 and internal chamber 46 for permitting the returning load flow to be delivered to a reservoir (not shown) in a conventional manner.

In operation, hydraulic fluid enters valving sub-assembly 10 from the housing input port (not shown) via circumferential groove 30 and the plurality of radial input ports 28 formed in valve spool 12. Fluid then flows through the identically numbered plurality of inlet slots 40 formed in valve spool 12 to the identically numbered pluralities of first and second output slots 24a and 24b, respectively, formed in valve sleeve 14 via first and second input flow control orifices 50a and 50b, respectively. Therefore, any load flow demanded by the power steering system is delivered through one set of first and second output ports 32a and 32b, respectively, and its corresponding one of first and second circumferential grooves 38a and 38b, respectively, and its respective housing output port (not shown) to its respective one of load lines 34a and 34b. Concurrently, the flow returning from the other of load lines 34a and 34b enters the control valve through the other of the housing output ports, the other of first and second circumferential grooves 38a and 38b, respectively, and the other of first and second output ports 32a and 32b, respectively. Thereafter, the returning flow passes through first and second return flow control orifices 52a and 52b, respectively, to the identically numbered plurality of return slots 42. Finally, the returning fluid flows through exhaust ports 44 and internal chamber 46 wherefrom it flows through a housing return port (not shown) to the reservoir.

In addition to the above, parasitic fluid flow is allowed to flow between first and second valve output slots 24a and 24b, respectively, via parasitic leakage slots 54 and one or more sets of first and second parasitic orifices 56a and 56b, respectively. In accordance with a preferred construction, input slots 40, return slots 42 and parasitic slots 54 are formed in the manner of transverse "woodruff key" slots. This can be seen most clearly in FIGS. 2A, 2B, 2C and 3 which are sectional views of transverse planes respectively, taken through input and return slots 40 and 42, respectively, first and second output ports 32a and 32b, and parasitic slots 40. Generally, input and return slots 40 and 42, respectively, are formed in a relatively narrow manner such that input flow control orifices 50a, 50b and return flow control orifices 52a and 52b, which are formed by overlapping portions of input and return slots 40 and 42, respectively, and first and second valve output slots 24a and 24b, have a pre-selected minimum area. Moreover, the size and configuration of input flow control orifices 50a and 50b and return flow control orifices 52a and 52b are chosen such that a selected value of pressure drop (i.e., 25[lb/in$^2$]) occurs at each flow control orifice when valving sub-assembly 10 is in its "centered" position.

The sets of first and second parasitic orifices 56a and 56b, respectively, are formed by overlapping portions of parasitic slots 54 and first and second output slots 24a and 24b, respectively. The length of parasitic slots 54 is selected such that respective ones of first or second parasitic orifices 56a or 56b, effectively limit parasitic flow upon closing of the controlling ones of first or second input flow control orifices 50a or 50b and/or return flow control orifices 52a or 52b in response to deflection of valve spool 12 relative to valve sleeve 14. Input slots 40, return slots 42 and parasitic slots 54 may, for instance, all be formed to be substantially equal in length as is generally shown in FIG. 1. However, other selected length relationships between input slots 40, return slots 42 and parasitic slots 54 may be chosen without departing from the spirit of the novel principles embodied in the present invention. By way of example, an alternate embodiment comprising two sets of symmetrically offset parasitic slots will be described hereinbelow in greater detail.

Figure 4A:
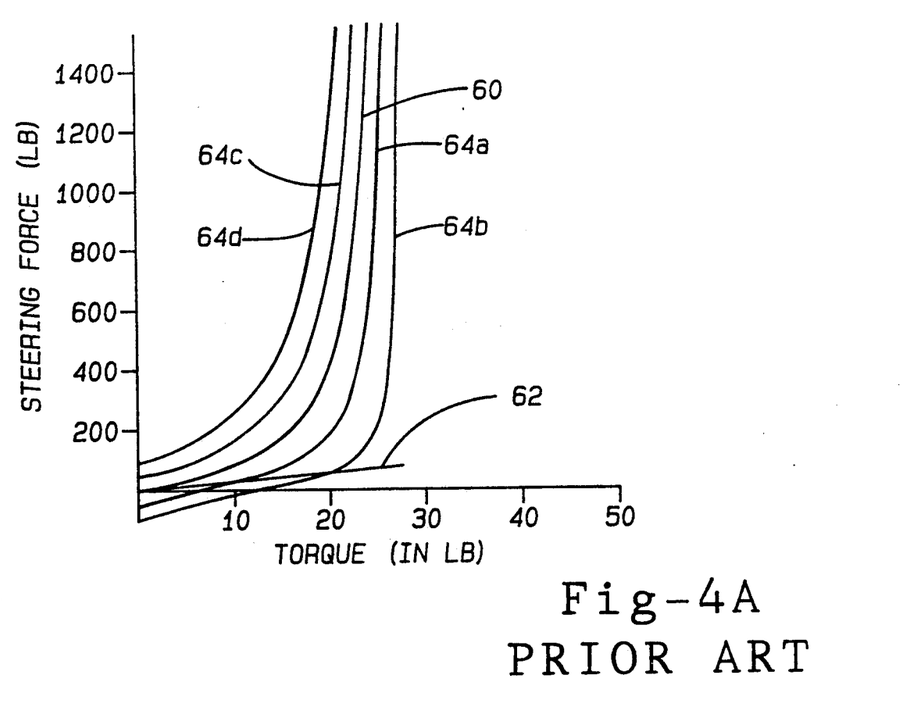
FIGS. 4A, 4B, 4C and 4D are exemplary graphs depicting the performance characteristic of a conventional speed controlled power steering system having parallel sets of low and high speed flow circuits.

The advantages associated with utilization of flow control valving having parasitic slots 54 in power steering system performance can best be judged by comparison with conventional "speed sensitive" control systems. As previously mentioned, it is known that a control valve with minimal control orifice area is capable of generating significant hydraulic "assist" at low, or even zero, input deflection angles. For instance, steering force as a function of applied torque (i.e, the torque applied to the steering wheel) for the low speed section of the steering valve noted in the above-identified SAE Paper would be substantially similar to that shown in FIGS. 4A and 4B. In FIG. 4A curve 60 depicts the total steering force derived as a function of applied torque under static conditions (i.e., when rotational velocities of the steering wheel are very slow) while line 62 depicts the "manual" (i.e., mechanical) steering force portion directly derived from applied torque via a mechanical path such as the pinion-rack interface of a rack-and-pinion steering gear.

Figure 4B:
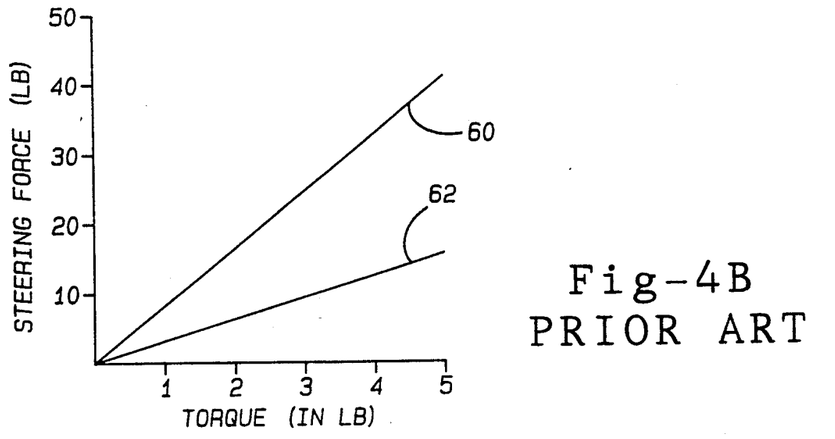

Exemplary curves 64a, 64b, 64c and 64d are presented depict the total steering force derived as a function of applied torque for values equal to +1[rev/sec], +2[rev/sec], −1[rev/sec] and −2[rev/sec], respectively. This family of curves reflects relatively smooth and stable steering response for large steering motions which are commensurate with "parking" maneuvers. However, as shown in FIG. 4B by the significantly magnified portion of curve 60, total steering force has a significantly greater value than the corresponding manual steering force portion shown by line 62 at low values of applied torque. In fact, the difference between curve 60 and line 62 equals the hydraulically-derived steering "assist" generated. Of particular interest is a comparison of the slopes of curve 60 and line 62 at a zero value of applied torque. The significant difference therebetween, as indicated in FIG. 4B, denotes an excessively light steering "on-center" feel when the motor vehicle is cruising on a highway.

Figure 4C:
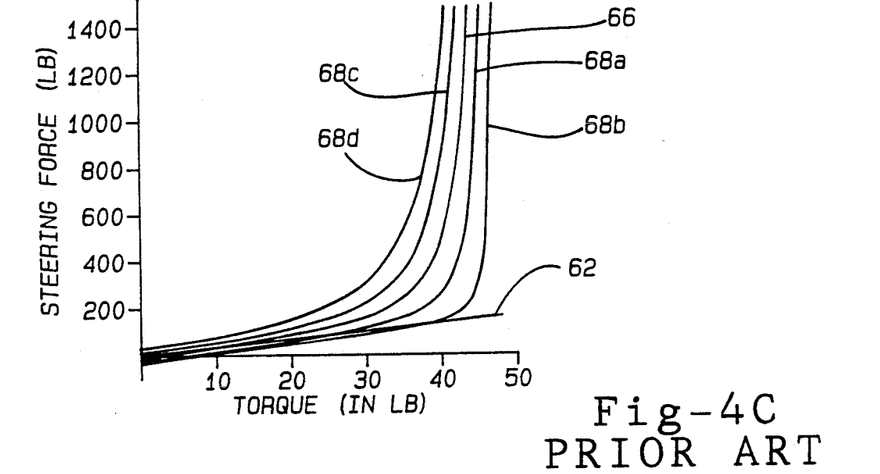
Figure 4D:
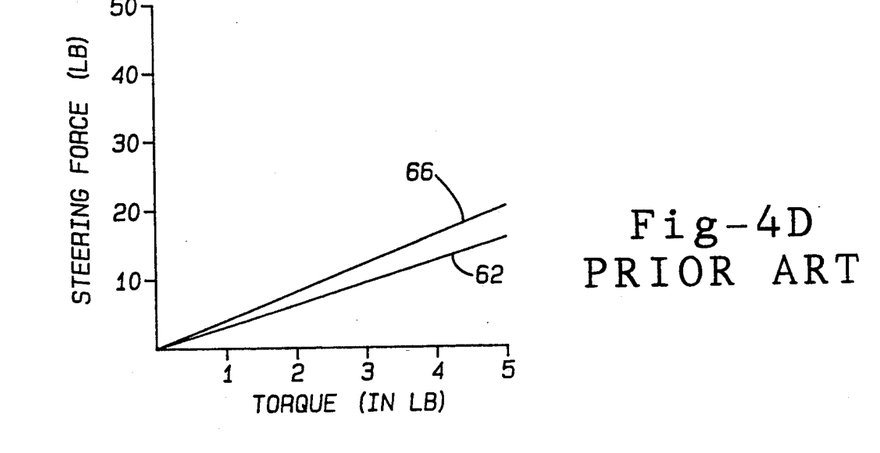

As noted hereinabove, the "prior art" power steering control valve described in SAE Paper 880707 includes a parallel high speed circuit which generally results in minimal hydraulic "assist" at low and moderate applied torque values when fully activated at high speeds. This is accomplished via utilization of a parallel set of tangentially extended control orifices which require greater valve deflection values to activate. Comparison data with respect to that shown in FIGS. 4A and 4B is shown in FIGS. 4C and 4D wherein curve 66 depicts the total steering force derived as a function of applied torque under static conditions and curves 68a, 68b, 68c and 68d depict the total steering force derived as a function of applied torque for rotational velocities of the steering wheel equalling +1[rev/sec], +2[rev/sec], −1[rev/sec] and −2[rev/sec], respectively. As can be seen in FIG. 4D, the relatively small difference between curve 66 and line 62 indicates that minimal values of steering assist are achieved at low values of applied torque. However, the tightly grouped family of curves 68a, 68b, 68c and 68d, and line 62 are also indicative of minimal assist levels right up to about 30[in-lb] of applied torque. Because the system uses a torsion bar having a known torsional stiffness, there is a concomitant control valve error angle (typically about 1.8°) which must be overcome before any useful steering assist occurs. Furthermore, the highly grouped nature of the various curves implies minimal characteristic damping (as depicted by lateral distance between the various curves) of the system. Both conditions are indicative of a power steering system that is susceptible to externally imposed transient loading. Symptoms generally include undue sensitivity to side wind loading and difficulty in tracking when ruts or streetcar tracks are encountered.

Figure 5A:
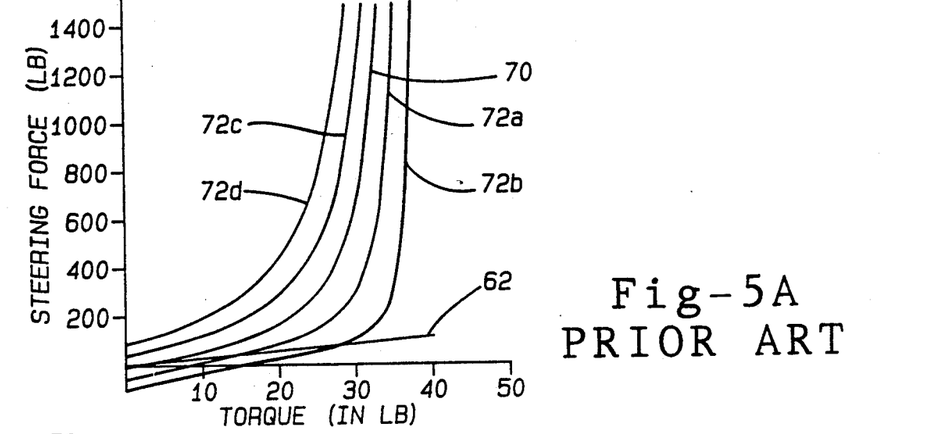
FIGS. 5A, 5B, 5C and 5D are exemplary graphs depicting the performance characteristics of a conventional speed controlled power steering system utilizing an electronically variable orifice ("EVO") valve.
Figure 5B:
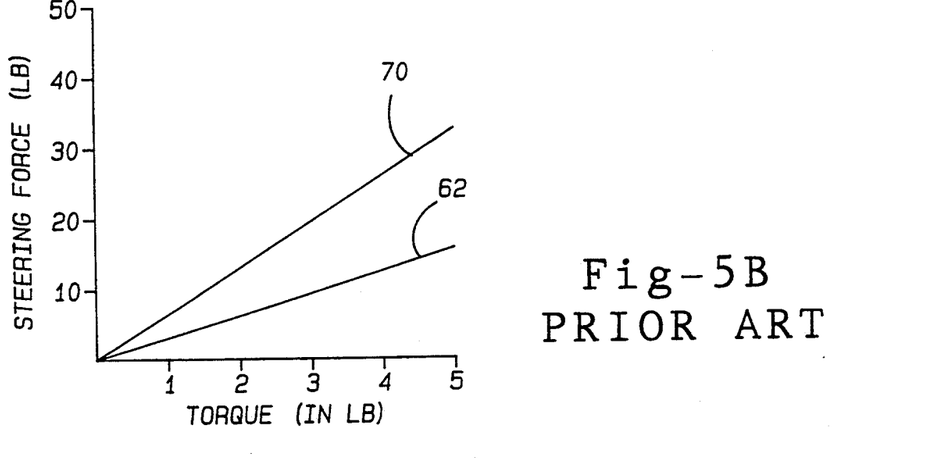

Also mentioned above was the utilization of an EVO (electronically variable orifice) valve to achieve "speed sensitive" steering. A similar array of curves 70, 72a, 72b, 72c and 72d depicting static, +1[rev/sec], +2[rev/sec], −1[rev/sec] and −2[rev/sec] respective values of rotational motion of the steering wheel is shown in FIG. 5A for a conventional EVO equipped power steering system in its low speed, or full fluid supply flow mode. These curves, as well as magnified segments of curve 70 and line 62 shown in FIG. 5B, depict a less effective, but generally similar low speed performance to that shown in FIGS. 4A and 4B.

Figure 5C:
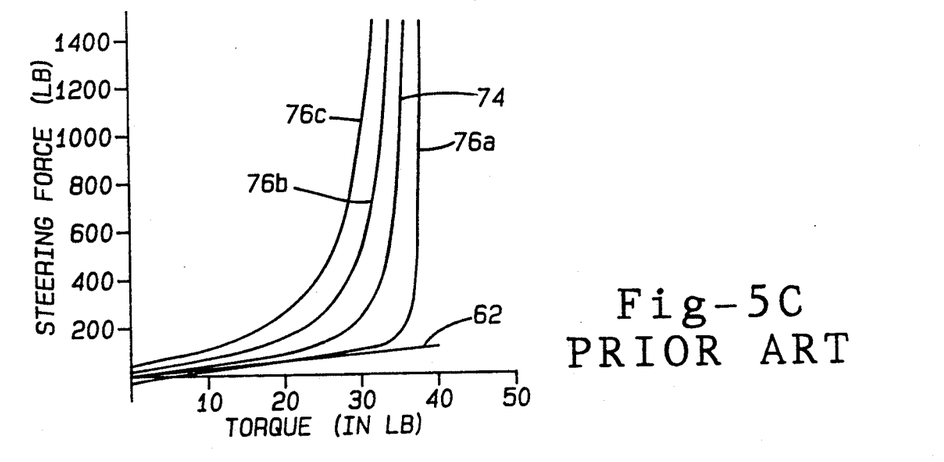
Figure 5D:
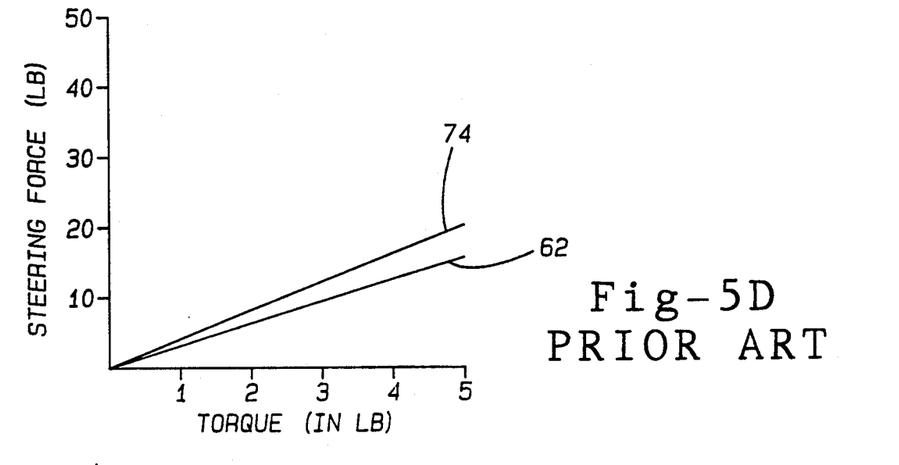

In addition, exemplary curves 74, 76a, 76c and 76d of FIGS. 5C and 5D show static, +1[rev/sec], −1[rev/sec] and −2[rev/sec] values of rotational motion of the steering wheel, respectively, for a conventional EVO equipped power steering system at high vehicular speeds. Again, these curves depict performance characteristics that are more-or-less similar to that shown in FIGS. 4C and 4D. However, the lack of an equivalent +2[rev/sec] curve (i.e., to curve 68b) reveals a problem inherent with EVO equipped power steering systems. Since the EVO valve functions to reduce the fluid supply flow rate, the potential exists that sufficient flow may not be available to service high steering wheel rotational motion rates. Thus, it would not be possible to execute an evasive maneuver commonly referred to as an "accident avoidance maneuver" without encountering another symptom commonly referred to as "pump catch" wherein the fluid flow is unable to provide for concomitant displacement of the system's power cylinder. In this condition, the vehicle operator momentarily encounters a sharp increase in resistance to steering motion and may be unable to fully execute the intended maneuver. Thus, with EVO equipped power steering systems it is generally necessary to provide detection capability for detecting rapid steering wheel motions and for opening the EVO (i.e., similar to the setting it has at low speed) in response thereto. Unfortunately, the vehicle operator will suddenly encounter overly light steering during the emergency maneuver.

Figure 6A:
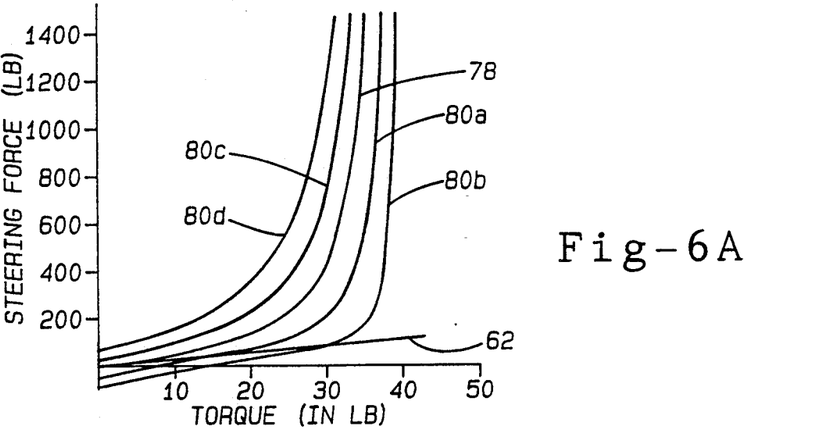
FIGS. 6A and 6B are exemplary graphs depicting the performance characteristic of a power steering system equipped with an open-center control valve having the improved valving sub-assembly shown in FIG. 1.
Figure 6B:
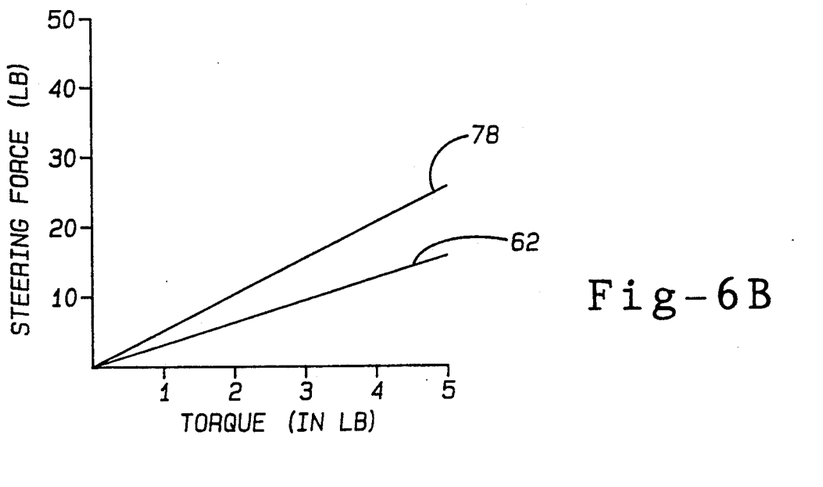

By way of contrast, curves 78, 80a, 80b, 80c and 80d of FIGS. 6A and 6B depict the superior performance of a power steering system equipped with valving subassembly 10 for static, +1[rev/sec], +2[rev/sec], −1[rev/sec] and −2[rev/sec] values of rotational velocity of the steering wheel, respectively. In this example, no speed sensitive feature is utilized. As can be seen, FIG. 6A shows a family of well behaved curves with excellent applied torque modulation with respect to both steering force levels and steering wheel rotational velocity levels. Likewise, FIG. 6B depicts a generally tangential relationship between curve 78 and line 62 at an applied torque value of zero. This is due to the fact that the hydraulic resistance presented by the sets of first and second parasitic orifices 54a and 54b, respectively, does not have a constant value. Because flow through an orifice is proportional to the square root of the pressure loss therethrough, the hydraulic resistance is proportional to flow rate. And, because under static conditions there is zero flow rate at zero applied torque (due to a zero value of pressure across the orifice), it follows that the hydraulic resistance also has a zero value and no pressure gradient can be developed until off center conditions prevail. In any case, power steering assist at zero applied torque is substantially zero which results in desirable on-center "feel". However, the power steering "assist" substantially recovers to a meaningful value at an applied torque level of about 5[in-lb]. Thus, a control valve error angle of only about 0.3[deg], or about one-sixth of that of the two circuit speed sensitive system described above is required in order to achieve useful steering assist.

Figures 2B, 2C:
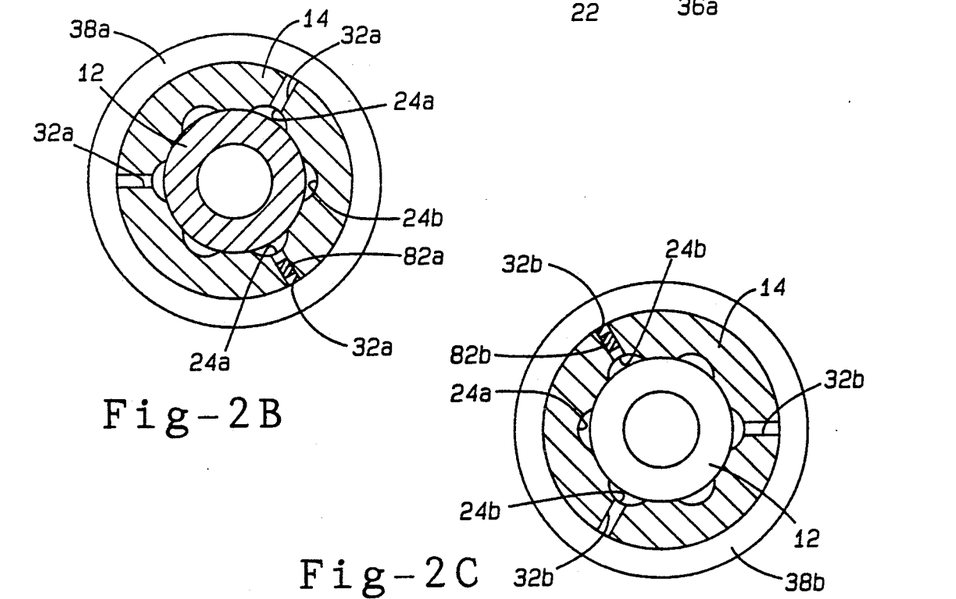
FIG. 2B and 2C are sectional views taken through the output ports of the valving sub-assembly shown in FIG. 1.
Figure 3:
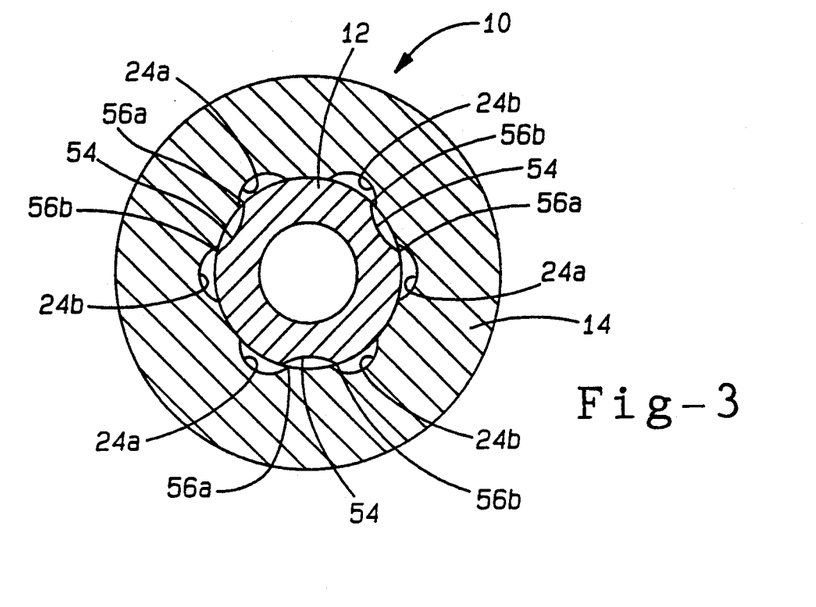
FIG. 3 is a sectional view illustrating the leakage slots and the parasitic orifice configuration associated therewith as incorporated into the improved valving sub-assembly shown in FIG. 1.
Figure 6C:
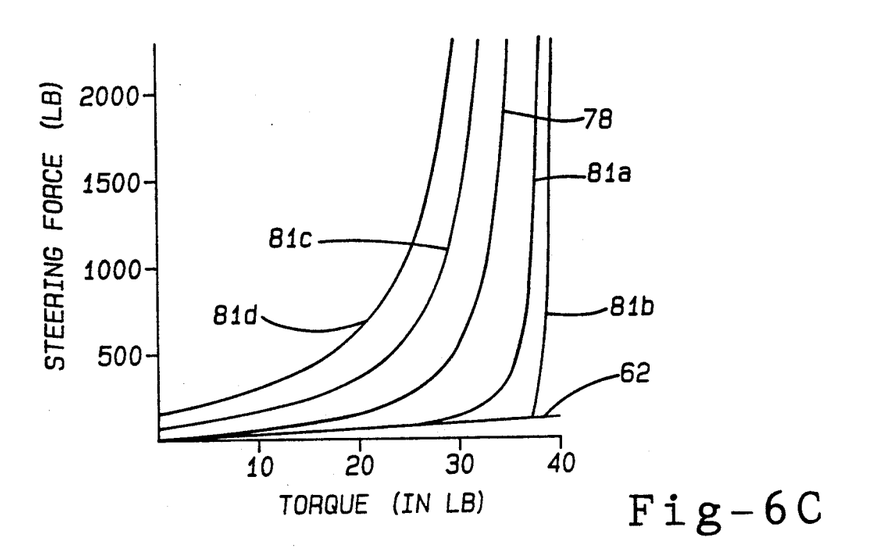
FIG. 6C and 6D are exemplary graphs depicting the performance characteristics of a control valve having a valving sub-assembly modified as shown in FIGS. 2B and 2C.
Figure 6D:
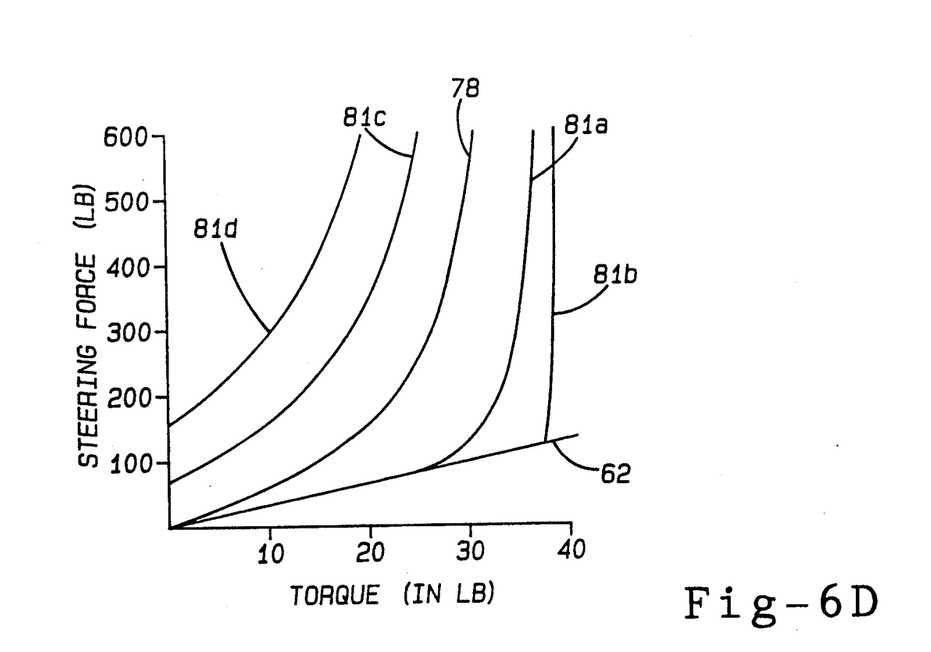

With reference to FIGS. 2B and 2C, it can be seen that one (or more for that matter) of the first and second output ports 26a and 26b, respectively, may optionally be blocked by first and second plugs 82a and 82b, respectively. The effect of doing this is to further spread curves 80a, 80b, 80c and 80d with respect to the location of curve 78. More particularly, curves 81a, 81b, 81c and 81d of FIGS. 6C and 6D depict the performance of a power steering system equipped with valving subassembly 10 for static, +1[rev/sec], +2[rev/sec], −1[rev/sec] and −2[rev/sec] values of steering wheel rotational velocity, respectively, with at least one of output ports 26a and 26b "blocked-off" in the manner shown. As can be seen, the result is a further increase in the above mentioned applied torque modulation with respect to both steering force levels and steering wheel rotational velocity levels. Also, FIG. 6D illustrates the largely tangential relationship between curve 78 and line 62 at an applied torque value of zero. As will be appreciated, instead of "blocking off" the ports using plugs, the actual number of radial ports bored into valve sleeve 14 may be varied during the manufacturing process.

Figure 7:
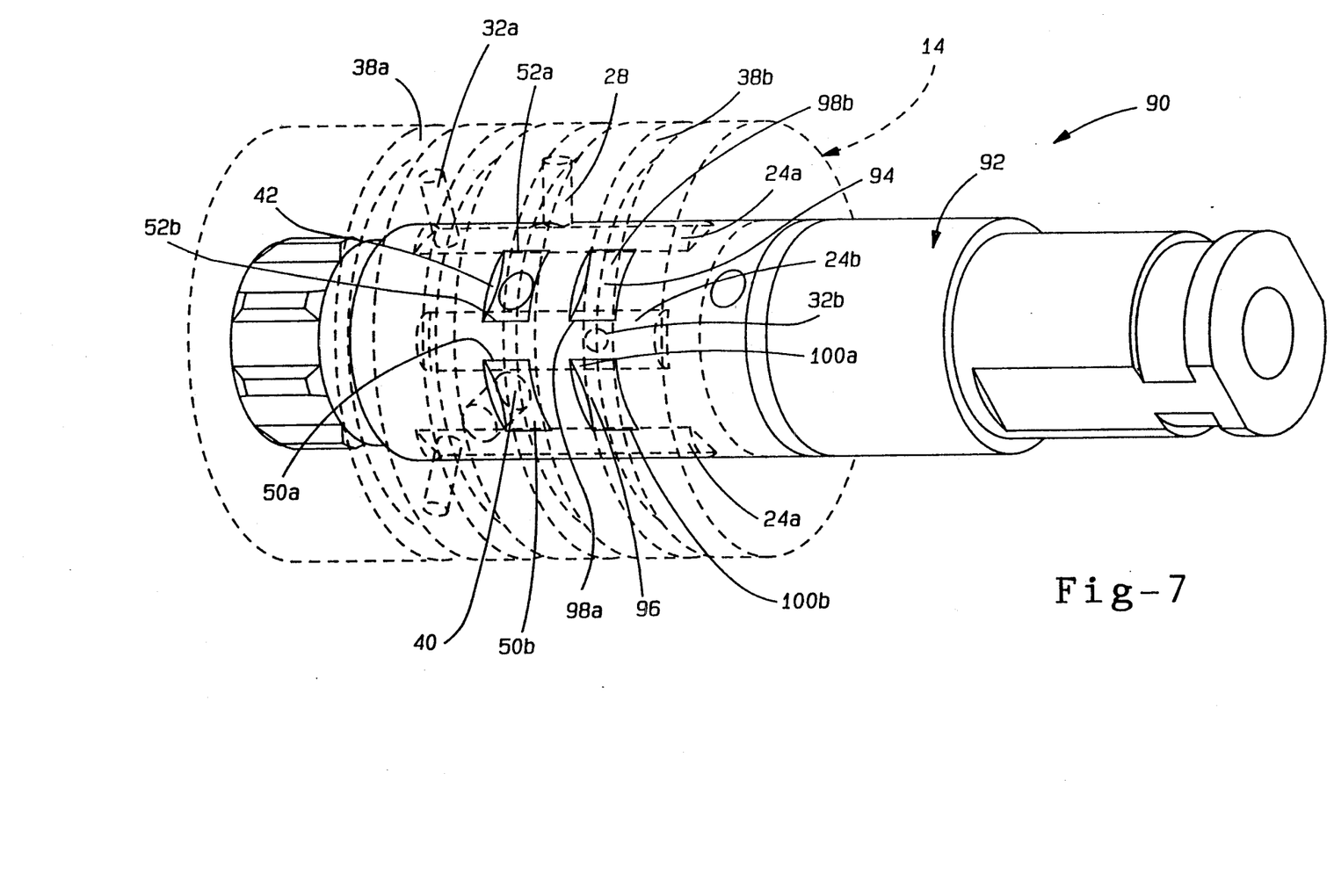
FIG. 7 is a perspective view of an improved valving sub-assembly constructed according to an alternative embodiment of the present invention.
Figure 8:
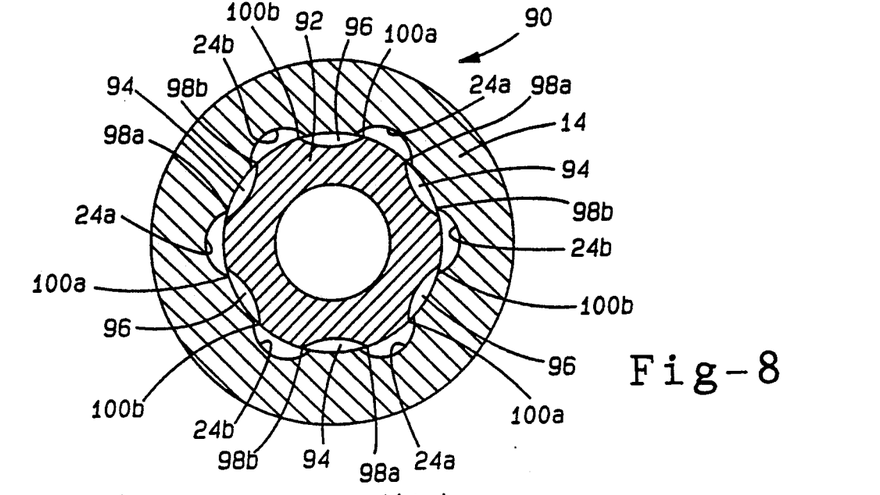
FIG. 8 is a sectional view illustrating the leakage slots and the parasitic orifice configuration associated therewith as incorporated into the valving sub-assembly shown in FIG. 7.

With reference now to FIGS. 7 and 8 of the drawings, a valving sub-assembly 90 is shown to include valve spool 92 and valve sleeve 14 (again shown in phantom in FIG. 7) which is constructed according to an alternate embodiment of the present invention. Generally, the hydraulic fluid flow path is the same as that shown above with relation to valving sub-assembly 10 and, where appropriate, like reference numbers are used to identify the various elements of valving sub-assembly 90 similar to those previously disclosed. However, in valve sub-assembly 90, parasitic fluid flow is handled by alternating sets of first and second parasitic slots 94 and 96, respectively, wherein a first set of first and second parasitic orifices 98a and 98b, respectively, is associated with the first parasitic slots 94 and a second set of first and second parasitic orifices 100a and 100b, respectively, is associated with the second parasitic slots 96. The first and second sets of parasitic slots 94 and 96, respectively, are offset from one another in a hydraulically symmetrical manner between first and second output slots 24a and 24b, respectively, such that first parasitic orifices 98a and 100a are equal in size but smaller than second parasitic orifices 98b and 100b which are also equal in size. Usually one or both sets of input flow control orifices 50a and 50b, and return flow control orifices 52a and 52b have tangential lengths greater than the first parasitic orifices 98a and 100a but less than the second parasitic orifices 98b and 100b.

In response to clockwise deflection of valve spool 92 with respect to valve sleeve 14, parasitic fluid flow through first parasitic slots 94 is shut off first when parasitic orifices 98a close while parasitic flow through second parasitic slots 96 continues even after first input and return flow control orifices 50a and 52a, respectively, have already closed. Conversely, in response to counterclockwise deflection of valve spool 92 relative to valve sleeve 14, parasitic fluid flow through second parasitic slots 96 is shut off first upon closing of parasitic orifices 100b while parasitic flow through first parasitic slots 94 continues even following closure of second input and return flow control orifices 50b and 52b respectively. Altering the parasitic flow function in this manner gives the valve designer an added degree of freedom in determining specific performance characteristics of a power steering system utilizing valving sub-assembly 90.

Figure 9A:
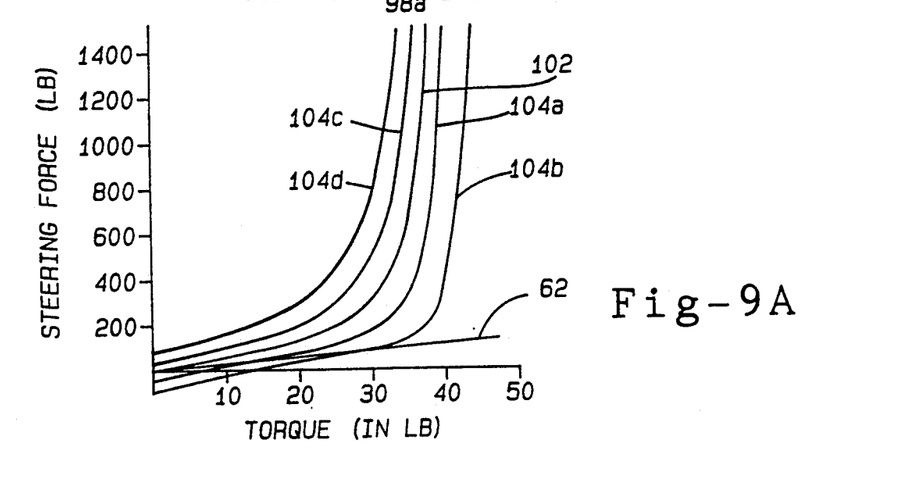
FIGS. 9A and 9B are exemplary graphs depicting the performance characteristic of a power steering system equipped with an open-center flow control valve having the valving sub-assembly shown in FIG. 7.
Figure 9B:
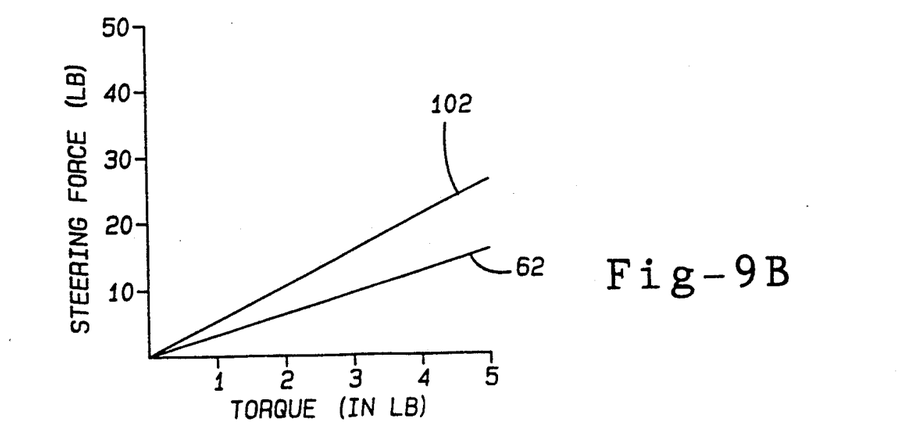

FIGS. 9A and 9B depict the performance of a power steering system equipped with valving sub-assembly 90 wherein the flexibility to increase applied torque values needed to achieve maximum positive direction steering wheel rotational velocities is clearly shown. In FIGS. 9A and 9B curves 102, 104a, 104b, 104c and 104d depict total steering force derived as a function of applied torque for static, +1[rev/sec], +2[rev/sec], −1[rev/sec] and −2[rev/sec] values of rotational motion of the steering wheel, respectively. Generally curves 102, 104a, 104c and 104d are similar to those seen before in FIGS. 6A and 6B. However, curve 104b is more-or-less uniformly displaced toward the right of FIG. 9A, thus implying that larger values of applied torque are required in order to achieve a rotational velocity of +2[rev/sec], as desired.

The foregoing discussion discloses and describes merely exemplary embodiments of the present invention. One skilled in the art will readily recognize from such discussion, and from the accompanying drawings and claims, that various changes, modifications and variations can be made therein without departing from the true spirit and fair scope of the invention as defined in the following claims.

What is claimed is:

1. An open-center control valve for a motor vehicle power steering system that is operable to selectively control the flow of hydraulic fluid to first and second input ports of a power output transducer for controlling the positioning of a mechanical device in response to rotational input applied to a steering wheel by a vehicle operator, said open-center control valve comprising:

a valving assembly having an inlet port, a return port and first and second output ports, a valve sleeve, a valve spool selectably rotatable within said valve sleeve, said valve assembly having a primary supply flow path having an inlet slot and a leakage flow path having a leakage slot, said leakage flow path being isolated from said supply flow path, said inlet and leakage slots both communicating fluid between said first and second output ports when said valve is in a centered position; and first and second load lines fluidly interconnecting said first and second output ports of said valving assembly with said first and second input ports of said power output transducer respectively, said valving assembly being operable to control output pressure applied to said first and second ports of said power output transducer and fluid flow therebetween in response to said rotational inputs.

2. The control valve of claim 1 wherein said leakage slots operate to regulate leakage flow across said output ports of said control valve as a function of tangential motion of said valve spool relative to said valve sleeve.

3. The control valve of claim 1 wherein said leakage slots are formed in said valve spool and a plurality of first and second output slots are formed to generate first and second leakage orifices between said leakage slots and said output slots in said valve sleeve.

4. The control valve of claim 3 wherein each said leakage slot is symmetrical with respect to each said inlet slot.

5. The control valve of claim 3 wherein each said leakage slot is unsymmetrical with respect to said inlet slot such that a first set of leakage slots form small leakage orifices with said first output slots and large leakage orifices with said second output slots, and a second set of leakage slots form small leakage orifices with said second output slots and large leakage orifices with said first output slots.

6. A method of controlling a power steering system in response to rotational inputs applied to a steering wheel, said method comprising the steps of:

providing a source of hydraulic fluid;

providing means for receiving said rotational inputs, said receiving means including an open-center control valve having first and second resiliently coupled valve members that are rotatable with respect to each other from a centered position in response to said rotational inputs;

supplying said hydraulic fluid to an inlet port of said open-centered control valve;

providing a supply flow path and a return path between first and second output ports of said open-center control valve;

controlling the output pressure applied to said first and second ports of said power output transducer and the fluid flow therebetween in response to said rotational inputs;

providing a leakage flow path between said first and second output ports of said open-center control valve;

isolating said leakage flow path from said supply flow path and said return flow path; and permitting leakage flow between said first and second output ports when said valve is in said centered position.

7. The method of claim 6 including the steps of forming output slots and return slots in said control valve which are in fluid communication with said first and second output ports defining control orifices with respect to said output slots in response to valve deflection between a valve spool and a valve sleeve for regulating the passage of fluid between said input and return slots and said output slots, and wherein said step of providing a leakage flow path comprises forming leakage slots in said valve spool that fluidically interconnect said valve sleeve output slots and which function to regulate said leakage flow therebetween as a function of said valve deflection.

8. The method of claim 7 wherein said leakage slots are formed to be non-symmetrical with respect to said input and return slots.

9. An open-center control valve for a motor vehicle power steering system that is operable to selectively control the flow of hydraulic fluid to first and second input ports of a power output transducer for controlling the positioning of a mechanical device in response to rotational input applied to a steering wheel by a vehicle operator, said open-center control valve comprising:

a valving assembly having an inlet port, a return port and first and second output ports, a valve sleeve, a valve spool selectably rotatable within said valve sleeve, said valve assembly having a primary return flow path having a return slot and a leakage flow path having a leakage slot, said primary return flow path being isolated from said leakage flow path, said return and leakage slots both communicating fluid between said first and second output ports when said valve is in a centered position; and first and second load lines fluidly interconnecting said first and second output ports of said valving assembly with said first and second input ports of said power output transducer respectively, said valving assembly being operable to control the output pressure applied to said first and second ports of said power output transducer and the fluid flow therebetween in response to said rotational inputs.

10. The control valve of claim 9 wherein said leakage slots operate to regulate leakage flow across said output ports of said control valve as a function of tangential motion of said valve spool relative to said valve sleeve.

11. The control valve of claim 9 wherein said leakage slots are formed in said valve spool and a plurality of first and second output slots are formed to generate first and second leakage orifices between said leakage slots and said output slots in said valve sleeve.

12. The control valve of claim 11 wherein each said leakage slot is symmetrical with respect to each said return slot.

13. The control valve of claim 12 wherein each said leakage slot is unsymmetrical with respect to said return slot such that a first set of leakage slots form small leakage orifices with said first output slots and large leakage orifices with said second output slots, and a second set of leakage slots form small leakage orifices with said second output slots and large leakage orifices with said first output slots.

* * * * *